July 24, 1928.
E. B. FLANIGAN
VEHICLE BRAKE
1,678,427
Original Filed Sept. 20, 1924    4 Sheets-Sheet 1
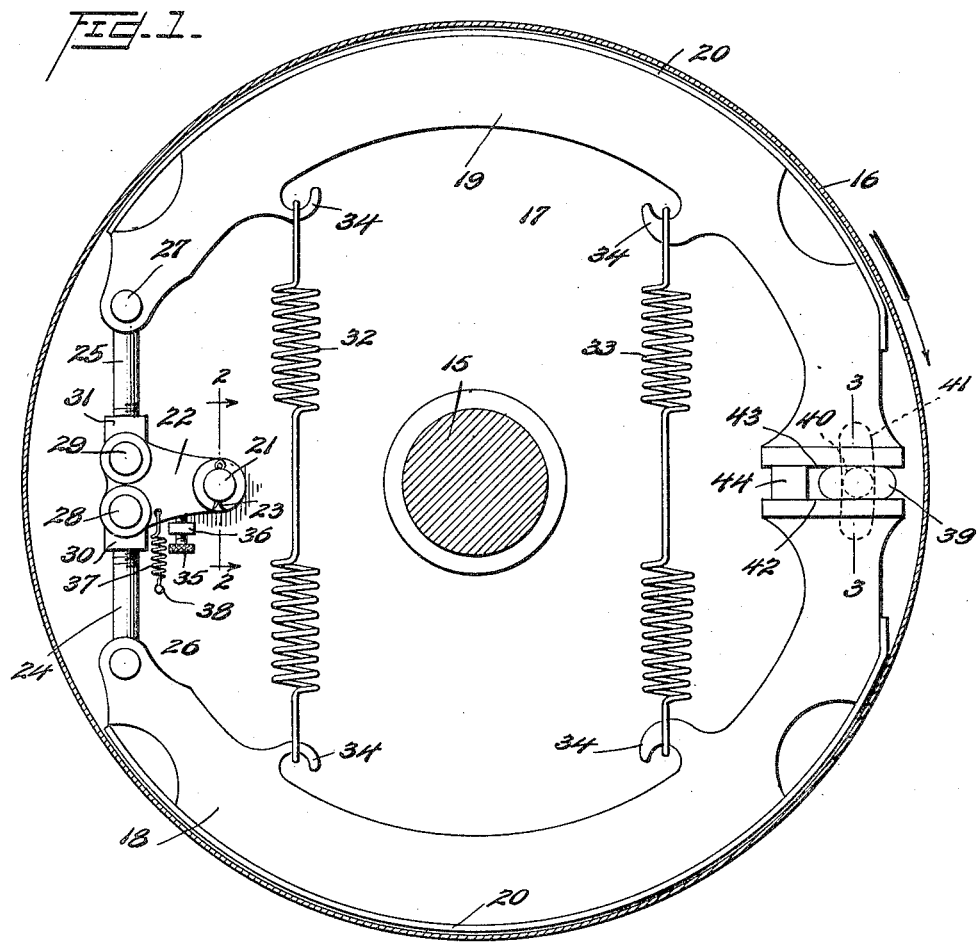
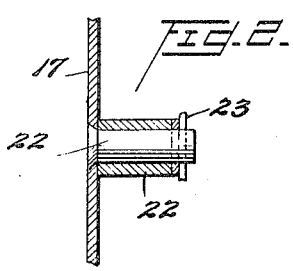
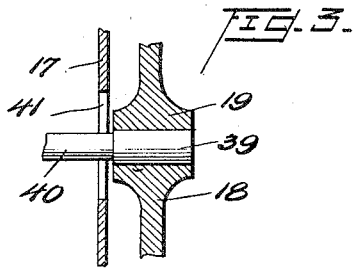
Inventor
E. B. Flanigan,
By Watson, Coit, Mora & Grindle,
Attorney July 24, 1928. 1,678,427
E. B. FLANIGAN
VEHICLE BRAKE
Original Filed Sept. 20, 1924 4 Sheets-Sheet 2
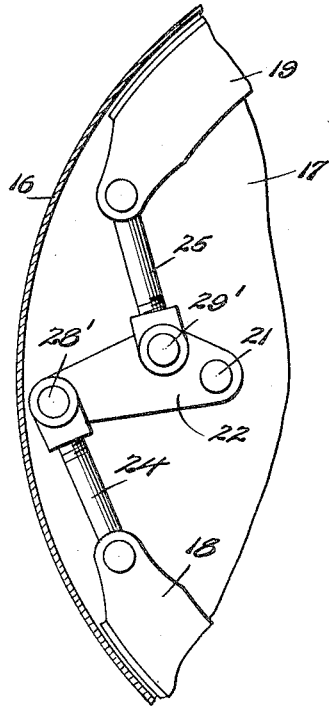
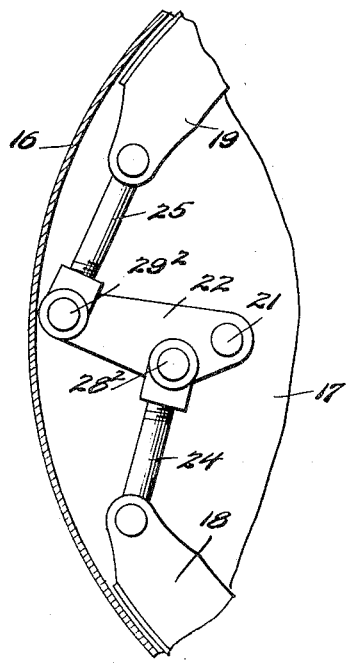
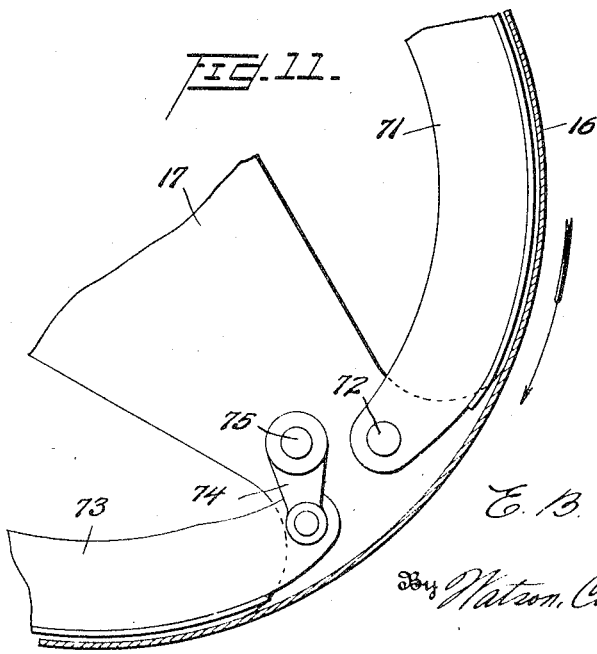
Inventor
E. B. Flanigan,
By Watson, Coit, Morse & Grindle
Attorney July 24, 1928.
E. B. FLANIGAN
VEHICLE BRAKE
Original Filed Sept. 20, 1924     4 Sheets-Sheet 3
1,678,427
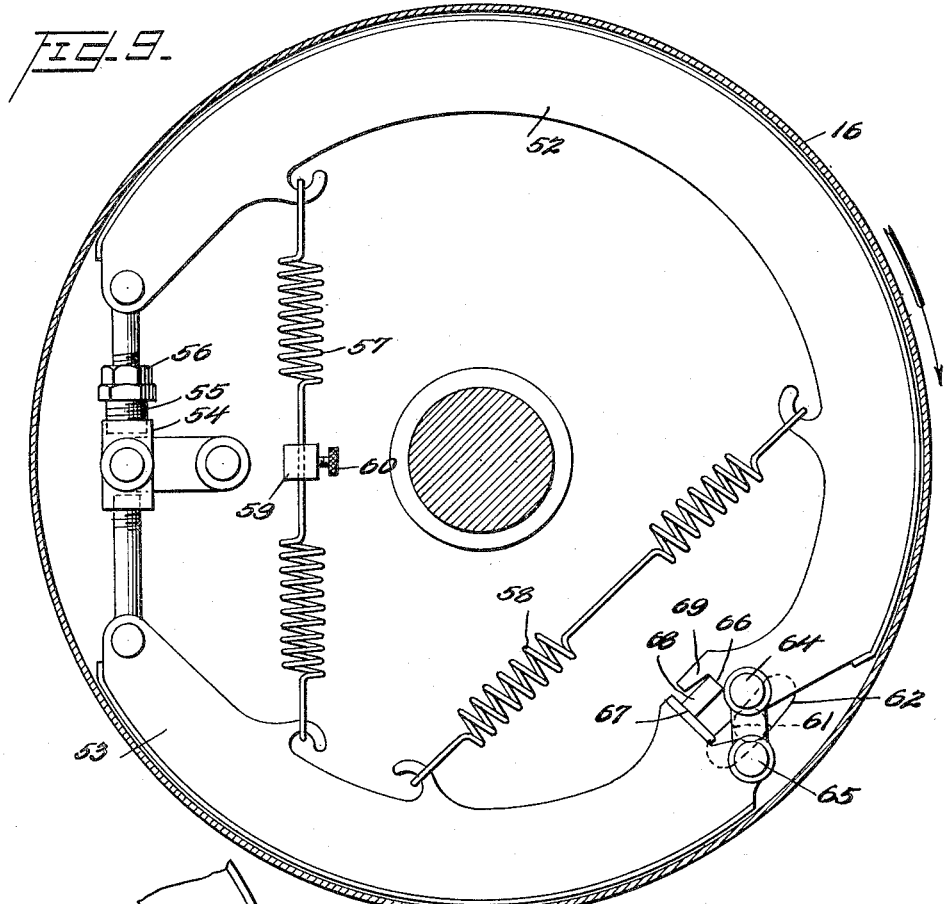
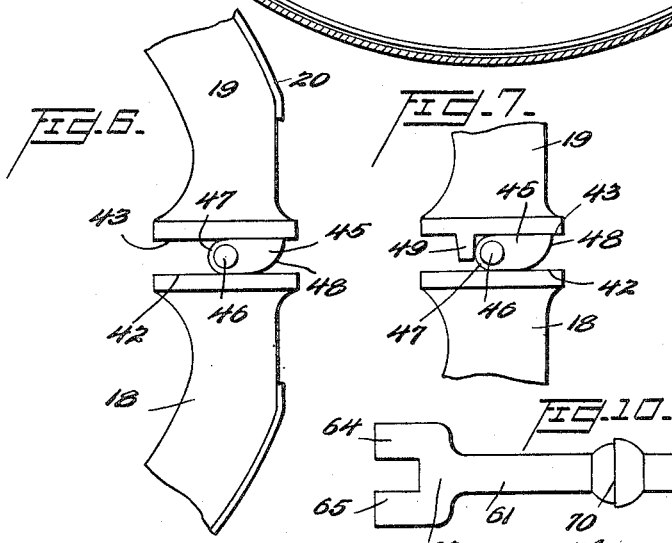

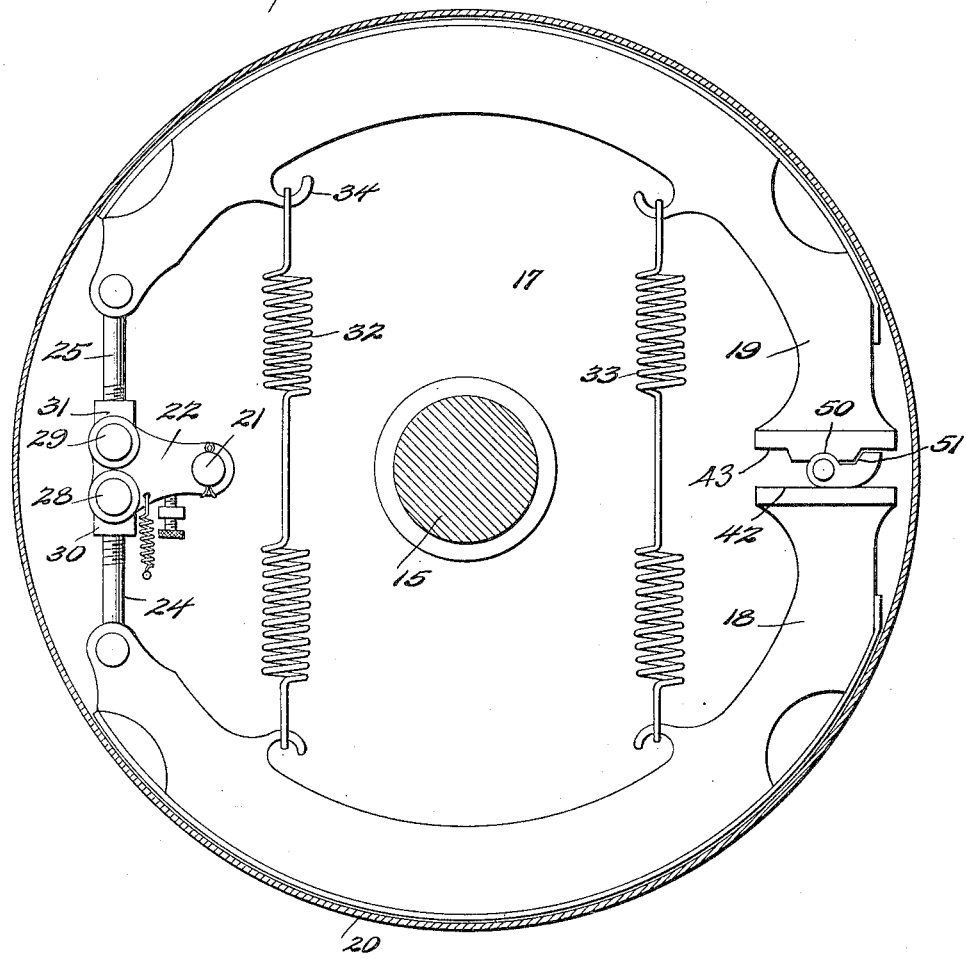

Patented July 24, 1928.

1,678,427

UNITED STATES PATENT OFFICE.

EDWIN B. FLANIGAN, OF WILKES-BARRE, PENNSYLVANIA, ASSIGNOR TO E. B. FLANIGAN, INCORPORATED, OF WILKES-BARRE, PENNSYLVANIA, A CORPORATION OF PENNSYLVANIA.

VEHICLE BRAKE.

Application filed September 20, 1924, Serial No. 738,818. Renewed June 8, 1928.

This invention relates to brakes, and more particularly to brakes of the internal expanding type for use on vehicles of the self-propelled type, although it may be adapted for use on hoisting apparatus or any other type of device requiring the use of an effective brake.

It is a general object of this invention to provide a novel and improved type of internal expanding brake.

More particularly, it is an object of this invention to provide an improved internal expanding brake of the self-energizing, self-wrapping or self-contained servo type.

A further object of this invention consists in the provision of an internal expanding type brake provided with a linkage at the hinged end.

A still further object of the invention consists in the provision of an internal expanding type brake in which one shoe of the brake transfers the reaction of the drum to the second shoe by means of a suspended hinged linkage.

Another and further object of the invention consists in the provision of an internal expanding type brake in which the braking reaction is not taken by the mechanism used for applying effort to the brake.

In the following specification and the accompanying drawings are disclosed various embodiments of the invention, with the understanding however that the particular modifications illustrated shall not be considered as limiting the invention to the particular proportions or arrangements of parts shown, nor to the particular application to any specific type of vehicle.

In said drawings:

Figure 1 is a side elevation of one form of brake mechanism constructed according to this invention viewed from the outside of the vehicle, and considering the radial wall of the brake drum removed;

Figure 2 is a transverse vertical section on line 2—2 of Figure 1;

Figure 3 is a transverse vertical section on line 3—3 of Figure 1;

Figures 4 and 5 are partial elevations of the hinge ends of the brake shoes showing methods of varying the reactions due to the self-energizing action of the brake;

Figures 6 and 7 are partial side elevations showing modified forms of mechanisms for actuating the brake;

Figure 8 is a side elevation of a brake provided with a further modified form of actuating means;

Figure 9 is a side elevation similar to Figure 1 of a modified type of brake construction;

Figure 10 is a partial elevation of a detail of the operating mechanism for the brake shown in Figure 9; and Figure 11 is a partial elevation of a further modified form of mechanism for applying the effort to the brake shoes.

Referring to Figures 1, 2 and 3, there is disclosed at 15 the axle of a vehicle wheel which may be either a live axle or a dead axle, depending upon whether the brake is applied to the rear or the front wheels. At 16 is shown the cylindrical portion of a brake drum which is rigidly connected to the wheel or other part whose motion is desired to be retarded by the brake. The brake spider 17 may be a solid disc or a pair of radial arms rigidly connected to the axle where a dead axle is used, or to the axle sleeve or tube where a live axle is used, and forming means on which the brake pivot and the actuating means may have their support. Each brake is provided with a pair of rigid brake shoes 18 and 19, which may be formed of any suitable cross section to provide rigidity and of any desired material, and having circumferential outer faces coaxial with the inner cylindrical face of the brake drum 16 and provided with any desirable kind of brake lining 20, as is well known in the art.

A hinge pin 21 is rigidly secured to the brake spider and extends perpendicular thereto and parallel to the axle 15 and serves to anchor for rotation thereabout the anchor link 22 which may be retained on the pin by means of the cotter 23. The brake shoes 18 and 19 are provided with the links 24 and 25 pivoted thereto at 26 and 27 and each pivoted to the anchor link 22 at the points 28 and 29. Suitable means of adjusting the length of the links 24 and 25 may be provided such as the tubular sleeves 30 and 31 fastened to the pivots 28 and 29 and with which the threaded ends of the links 24 and 25 cooperate. Brake retractile springs 32 and 33 connected between opposite brake shoes by means of the hooks 34 serve to release the brakes and prevent them from dragging on the drum. An adjustable stop screw 35 is threaded through the bracket 36 fastened to the brake spider and serves to limit the downward movement of the anchor link 22 by abutting against the lower surface thereof, thus preventing the weight of the whole mechanism from being applied to the lower side of the brake drum. The anchor link is normally retained against this stop screw 35 by means of the coil spring 37 connected between the link 22 and a pin 38 on the brake spider.

The braking effort is applied between the ends of the brake shoes 18 and 19 opposite the anchor ends, and for this purpose any suitable mechanism such as a floating toggle or floating cam may be used. In the construction illustrated, a floating cam is shown. Such a cam is well known in the art and may be briefly described as including the cam 39 mounted upon a brake shaft 40 which extends parallel to the axle 15 and may be rotated by any suitable mechanism, such as the foot pedal of an automobile and its associated linkage. The shaft 40 is free to move vertically in a slot 41, and for this purpose may be carried by any suitable mechanism as is well known in order that the effort of the cam 39 may be equally applied to each of the parallel faces 42 and 43 of the brake shoes 18 and 19. A fixed stop 44 is rigidly connected to the brake spider and is adapted to be engaged by either of the faces 42 or 43 of the brake shoes, depending upon the direction of rotation of the brake drum.

The operation of the above described brake is as follows. Assuming the direction of rotation of the brake drum to be that shown by the arrow, that is, clockwise, as viewed in Figure 1, then any rotation of the brake shaft 40 will cause the cam 39, by cooperation with the faces 42 and 43, to expand the brake shoes forcing them into engagement with the inner surface of the brake drum, whereupon the shoes 18 and 19 will be partially rotated with the brake drum, the face 43 cooperating with the fixed stop 44 and limiting the movement of the upper shoe 19. Continued movement of the shoe 18 will be resisted by the link 24 which transfers the reaction of this brake shoe through the links 22 and 25 to the upper brake shoe 19. By reason of the fact that the anchor link 22 is pivoted about the fixed hinge pin 21, this self-energizing action of the brake will serve to force the upper brake shoe 19 strongly into engagement with the brake drum, the force, however, not being tangential owing to the restraining action of the pivoted link 22, but being rather a direct radial thrust against the shoe which is resisted by the stop 44. The stop 44 relieves the cam 39 of all braking reaction, the floating arrangement thereof permitting the cam to continue to apply force to the lower shoe and thus more braking effort can be obtained with less pedal pressure than with the ordinary type of expanding brake, since a portion of the energy of the rotating drum is used to apply the upper brake shoe.

When the brake drum rotates in the direction indicated by the arrow, the link 22 is moved away from the adjustable stop screw 35 when the brakes are applied, but upon reverse movement of the brake drum, the action, above described, of transferring the effort from one shoe to another is prevented from taking place by the limited downward movement of the anchor link 22 so that upon reverse movement of the brake drum, the brake acts in somewhat the normal manner, effort being applied to both shoes by means of the cam.

Where it is desired to increase the self-energizing effect of the brake, the positions in which the links 24 and 25 are connected to the link 22 may be changed, as shown in Figure 4, so that the link 24 is pivoted at the point 28', a greater distance from the hinge pin 21 than is the pivot point 29' of the link 25, and thus the lever arm 21, 28' through which the braking reaction is applied is longer than the lever arm 21, 29', and thus additional self-energizing effect is applied to the upper brake shoe.

However, if it is desired to reduce this effect, the construction shown in Figure 5 may be used, in which case the lever arm 21, $28^2$ is shorter than the lever arm 21, $29^2$, and thus less of the reaction of the lower brake shoe is transferred to the upper brake shoe and more of the braking effort must be applied through the cam.

Figures 6, 7 and 8 illustrate modified means for applying force to the brake shoes, serving to eliminate the use of the fixed stop and of the floating cam. In Figure 6, the brake shoes 18 and 19 are shown provided with the parallel faces 42 and 43, as in Figure 1, but the fixed stop 44 has been omitted, and the floating cam 39 replaced by the cam 45 which rotates with the shaft 46 journalled in a fixed bearing. The heel 47 of the cam is concentric with the axis of rotation thereof, while the operating face 48 is curved as shown to gradually act on the face 42 of the lower brake shoe. With this type of construction, the effort of the cam is applied only to the shoe 18, the reaction of the shoe 19 being taken between the face 43 thereof and the concentric heel 47 of the cam, it being understood that the cam is rotated in a clockwise direction, as viewed in this figure. This construction has the advantage of fewer parts and economy of manufacture, being however equally as effective as that disclosed in Figure 1.

In Figure 7, the construction is substantially identical with that shown in Figure 6 with the addition of the depending lug 49 formed integral with the upper brake shoe 19 and extending from the face 43 thereof so that it cooperates with the heel 47 of the cam, thus effectively preventing radial outward movement of the end of the brake shoe 19 and eliminating any tendency toward jamming at this point, and at the same time minimizing the wear upon the brake lining closely adjacent to this end of the upper brake shoe.

In Figure 8 the design of Figure 7 is further modified by providing an arcuate slot 50, in the face 43 of the brake shoe 19 which rides upon the concentric heel of the cam, which is further cut away as at 51 to accommodate the metal surrounding the slot 50. This construction provides a stop for the shoe 19 in the same manner as the constructions disclosed in Figures 6 and 7; prevents jamming and undue wear at the top of the upper brake shoe; and further prevents inward movement of the upper brake shoe when released, thereby eliminating rattling.

The devices disclosed in Figures 6, 7 and 8 are suitable for use with double brakes, that is, where two substantially similar brakes are arranged side by side to act on the same brake drum and adapted to be used independently.

With any of the modifications thus far described, the adjustable stop screw 35 and its spring 37 may be eliminated by the use of a spring such as that shown in Figure 9, which is anchored at its center point in an adjustable clamp so that the weight of the shoes may be taken by the lower portion of the spring and thus prevent them from dragging. With this construction, the operation on backing will be substantially identical with that obtained upon forward movement, and thus more effective operation of the brakes is assured.

In Figure 9 is shown a modified type of brake in which the upper shoe 52 which receives the self-energizing reaction from the lower shoe 53 is much larger than the shoe which supplies this energy, and thus at times may be more effective and will require less effort on the part of the operator. The anchor link and the associated links which connect the two shoes thereto are substantially identical in operation with those described in connection with Figure 1. However, if desired a further adjusting means may be provided on the upper link so that its length can be adjusted without removing the pivot pin, and for this purpose the sleeve 54, which is pivoted to the anchor link, is threaded to receive the differentially threaded sleeve 55 into which the upper link is screwed, a lock nut 56 being provided to retain the adjustment as desired. Two brake release springs 57 and 58 are provided in the manner of Figure 1, but the spring 57 has a straight central portion passing through a slot in the bracket 59 fastened to the brake spider, and may be adjustably clamped therein by means of the screw 60. Such a spring may be termed a compensating spring and can readily be adjusted to prevent dragging of the lower brake shoe on the brake drum. This form of brake is operated by the usual brake shaft 61 floating in the slot 62 and provided with the forked end 63, one prong of which is rotatively mounted in each brake shoe, as shown at 64 and 65. The line passing through the centers of the prongs 64 and 65 is arranged at a substantial angle to the radius passing between the two brake shoes, so that upon rotation of the rod 60 the two prongs of the fork will force the brake shoes apart and into contact with the inner surface of the brake drum. The brake shoes are provided with the parallel faces 66 and 67 adapted to cooperate respectively with the fixed stop 68 depending upon the direction of rotation of the brake drum. The upper shoe 52 is also provided with the flange 69 depending from the face 66 to prevent outward movement of the lower end of this brake shoe in the same manner as is shown by the portion 49 described in connection with Figure 7. The brake shaft 60 is preferably jointed as shown at 70 and mounted in some form of swivel bearing to allow it freedom of action.

The operation of this brake is substantially identical with that described in connection with Figure 1, or Figure 1 provided with the spring as shown in Figure 9, but the shoes, owing to their relative proportions, serve to more equally distribute the wear on the brake lining, since the portion which does the most work is provided with the most brake lining surface. When this brake is operated in reverse, the larger shoe becomes the operating shoe, and of course slightly more effort is required for the same retarding effect.

In Figure 11 is shown the operating end only of a modified form of brake in which the upper shoe 71 is hinged to the brake spider by means of a fixed pin 72, whereas the operating shoe 73 is swung into contact with the brake drum by means of a short lever 74 carried by the brake shaft 75 journalled in a fixed bearing in the brake spider.

This brake may be termed a one-way brake suitable for use on front wheels or any place where it is not required that the brake be as powerful in reverse as when moving in a forward direction. The reaction from the upper shoe is taken by the fixed pin 72, and the lower shoe transfers the force of rotation of the brake drum to the upper shoe, thus making this brake also self-energizing. This construction is especially simple and economical to manufacture, eliminating as it does the swinging or floating actuating devices, and therefore being less liable to rattle.

All of the brakes described above are suitable for use on automotive vehicles, but they can also be applied with equally good results to hoisting drums and similar devices. The advantages of an internal expanding brake over the external contracting brake are too well known to need recapitulation, but the main difficulty heretofore with such brakes has been the additional effort required on the part of the operator to obtain suitable retardation, which fault has been effectively overcome by the present invention, which makes use of the energy of the rotating brake drum to augment the effort of the operator and thus decelerate with but a light pressure of the foot. This results in the elimination of considerable weight, since the various brake actuating rods, levers, and linkages may be of lighter construction and thus cheaper to manufacture.

Having thus described my invention what I claim as new and desire to be secured by Letters Patent is:

1. Brake mechanisms of the internal expanding type including in combination, a rotatable brake drum, a pair of brake shoes, a relatively stationary brake spider, a link pivoted to said spider to swing in the plane of said shoes, link means connecting one end of each shoe to said first mentioned link, and means to separate the opposite ends of said shoes.

2. Brake mechanism of the internal expanding type including in combination, a brake drum mounted for rotation on an axle, a stationary brake spider, a pair of self-centering brake shoes adapated to cooperate with said drum, means to expand said brake shoes at one end into contact with said drum, a pair of adjustable links, one pivoted to each of said brake shoes and a third link pivoted to both said links and to said spider to transfer the reaction of the drum on one brake shoe to the other.

3. In a self-energizing internal brake, in combination, a brake drum, brake shoes, a pair of links connecting adjacent ends of certain of said shoes, a third link connecting said pair of links to a fixed hinge pin, means to expand said brake shoes against said drum and stop means to limit the rotation of said shoes with said drum when expanded against it.

4. In a self-energizing internal brake, in combination, a brake drum, two brake shoes, a pair of adjustable links connecting adjacent ends of said shoes, a third link connecting said pair of links to a fixed hinge pin, means to expand the opposite ends of said brake shoes and stop means for said ends to limit the rotation of said shoes with said drum when expanded against it.

5. In a self-energizing internal brake, in combination, a brake drum, two brake shoes, a pair of links connecting adjacent ends of said shoes, a third link connecting said pair of links to a fixed hinge pin, means to expand the opposite ends of said brake shoes, stop means for said ends to limit the rotation of said shoes with said drum when expanded against it, and means to prevent radial movement of one of said ends.

6. Brake mechanism of the internal expanding, self-energizing type, including in combination, a rotatable brake drum, a stationary brake spider, a pair of brake shoes adapted to cooperate with the inner surface of said brake drum, an anchor pin fastened to said spider, a substantially radial anchor link pivoted thereto, a link connecting one end of one brake shoe to said anchor link, a second link connecting the adjacent end of the other shoe to said anchor link and means for expanding the opposite ends of said brake shoes to cause them to contact with said drum.

7. Brake mechanism of the internal expanding, self-energizing type, including in combination, a rotatable brake drum, a stationary brake spider, a pair of brake shoes adapted to cooperate with the inner surface of said brake drum, an anchor pin fastened to said spider, a substantially radial anchor link pivoted thereto, a pair of adjustable links each connecting one end of a brake shoe to said anchor link, and means for expanding the opposite ends of said brake shoes to cause them to contact with said drum.

8. Brake mechanism of the internal expanding, self-energizing type, including in combination, a rotatable brake drum, a stationary brake spider, a pair of brake shoes adapted to cooperate with the inner surface of said brake drum, an anchor pin fastened to said spider, a radial anchor link pivoted thereto, links connecting one end of each brake shoe to said anchor link, adjustable means to support the shoe assembly, means for expanding the opposite ends of said brake shoes to cause them to contact with said drum, and means to limit the rotation of said shoes with said drum.

9. Brake mechanism of the internal expanding, self-energizing type, including in combination, a rotatable brake drum, a stationary brake spider, a pair of brake shoes adapted to cooperate with the inner surface of said brake drum, an anchor pin fastened to said spider, a radial anchor link pivoted thereto, a pair of links respectively connecting one end of each brake shoe to said anchor link, means for expanding the opposite ends of said brake shoes to cause them to contact with said drum, and spring means to retract said brakes and to prevent dragging.

10. Brake mechanism of the internal expanding, self-energizing type, including in combination, a rotatable brake drum, a relatively fixed brake spider, a pair of brake shoes adapted to cooperate with said brake drum, a pair of links connecting adjacent ends of said shoes, link means anchoring said links to said spider, and means at the opposite ends of said shoes to expand them into contact with said drum, said link assembly allowing a partial rotation of said shoes with said drum.

11. Brake mechanism of the internal expanding, self-energizing type, including in combination, a rotatable brake drum, a fixed brake spider, a pair of brake shoes adapted to cooperate with said brake drum, a pair of links connecting adjacent ends of said shoes, means hingedly anchoring said links to said spider, and means at the opposite ends of said shoes to expand them into contact with said drum, said means forming a substantially non-reacting stop for one of said shoes.

12. Brake mechanism of the internal expanding, self-energizing type, including in combination, a rotatable brake drum, a fixed brake spider, a pair of brake shoes adapted to cooperate with said brake drum, a pair of links connecting adjacent ends of said shoes, means hingedly anchoring said links to said spider, and a cam rotatable about a fixed axis to expand said shoes into contact with said drum, said cam having a heel concentric with said axis to form a non-reacting stop for the self-energized shoe.

13. Brake mechanism of the internal expanding, self-energizing type, including in combination, a rotatable brake drum, a fixed brake spider, a pair of brake shoes adapted to cooperate with said brake drum, a pair of links connecting adjacent ends of said shoes, means hingedly anchoring said links to said spider, and means at the opposite ends of said shoes to expand them into contact with said drum, one of said shoes transferring the energy of rotation of said drum to the other through said linkage to force it into tighter contact with said drum.

In testimony whereof I hereunto affix my signature.

EDWIN B. FLANIGAN.